(12) United States Patent
Kumar et al.

(10) Patent No.: US 7,144,162 B2
(45) Date of Patent: Dec. 5, 2006

(54) HIGH SPEED ROLLING ELEMENT BEARING ANTI-CAVITATION CAGE

(75) Inventors: Arun Kumar, Chandler, AZ (US); Raymond J. Knorr, Tempe, AZ (US)

(73) Assignee: Honeywell International, Inc., Morristown, NJ (US)

( * ) Notice: Subject to any disclaimer, the term of this patent is extended or adjusted under 35 U.S.C. 154(b) by 50 days.

(21) Appl. No.: 10/942,533

(22) Filed: Sep. 15, 2004

(65) Prior Publication Data

US 2006/0056753 A1 Mar. 16, 2006

(51) Int. Cl.
*F16C 33/46* (2006.01)

(52) U.S. Cl. ...................... 384/470; 384/572

(58) Field of Classification Search ........ 384/470, 384/572–580
See application file for complete search history.

(56) References Cited

U.S. PATENT DOCUMENTS

| | | |
|---|---|---|
| 3,597,031 A | 8/1971 | Bill |
| 3,743,369 A | 7/1973 | Langstrom |
| 4,425,011 A | 1/1984 | Cunningham et al. |
| 4,428,628 A | 1/1984 | Brown |
| 4,787,757 A | 11/1988 | Finger |
| 5,522,667 A | 6/1996 | Miyake |
| 5,540,506 A | 7/1996 | Yokota et al. |
| 5,584,583 A * | 12/1996 | Hidano ............ 384/470 |
| 5,816,713 A | 10/1998 | Prock et al. |
| 6,102,580 A | 8/2000 | Alling et al. |
| 6,461,049 B1 | 10/2002 | Straub et al. |
| 6,511,228 B1 | 1/2003 | Dusza |
| 6,533,462 B1 * | 3/2003 | Kawakami ............ 384/470 |
| 6,540,404 B1 | 4/2003 | Dornhoefer et al. |
| 6,568,857 B1 | 5/2003 | Richard et al. |

* cited by examiner

*Primary Examiner*—Lenard A. Footland
(74) *Attorney, Agent, or Firm*—Ingrassia Fisher & Lorenz

(57) ABSTRACT

A rolling element bearing anti-cavitation cage is a circular ring with a plurality of cage pockets at predetermined intervals along a circumference of the circular ring. Each of the cage pockets has at least one groove on the leading edge of the cage pocket and at least groove on the trailing edge of the cage pocket. An assembled rolling element bearing is also provided in which the rolling element bearing anti-cavitation cage has rolling elements within the cage pockets and in concentrically disposed between inner and outer races. A method for preventing cavitation during the operation of an assembled rolling element bearing using the cage is also provided.

17 Claims, 5 Drawing Sheets

HIGH SPEED ROLLING ELEMENT BEARING ANTI-CAVITATION CAGE

GOVERNMENT RIGHTS

This invention was made with Government support under DAAH10-03-2-007 awarded by the U.S. Army. The Government has certain rights in this invention.

BACKGROUND OF THE INVENTION

The present invention relates generally to a rolling element bearing and cage assembly. More specifically, the present invention relates to a high speed rolling element bearing and cage assembly wherein the cage is designed to reduce or eliminate cavitation of the lubricating oil.

Cavitation damage in the rolling element bearing cage occurs because of back and forth oscillation of the rolling element bearing against the cage within the cage pocket. The frequency, and thus the speed, of this oscillation may be high in high speed rolling element bearings. When the rolling element and cage come closer in proximity, lubricating oil can be squeezed out and, due to the oil's inertia, is unable to move quickly to fill the gap as the rolling element and cage move apart from each other. This creates a low pressure region which results in cavitation where the air dissolved in the oil escapes and forms a bubble. When this bubble collapses, it causes a large, sudden force on the cage resulting in damage at the rolling element/cage interface. This damage causes the cage material to spall and break away from the cage. After repeated cavitation formation and collapse, the cage fails under fatigue.

There have been changes in the design of rolling element bearing and cage assemblies to improve the lubrication of the bearing and cage. However, none of these bearing and cage assembly designs address the problem of cavitation. For example, U.S. Pat. No. 3,597,031 discloses a bearing cage having lubrication reservoirs for lubricating the pocket of the bearing cage. The cage also is provided with lubrication passages for passing the lubricant from the reservoir to the pocket. The passages however, while preventing wear of the cage pilots adjacent to the pocket, do not prevent cavitation wear of the bearing cage assembly.

U.S. Pat. No. 5,584,583 describes a roller and cage assembly having a cage with high rigidity where side slits located between the cage and the weights of a crankshaft provide lubrication to the cage. However, the slits, while being of sufficient width to provide good lubrication to the cage, are too wide to control cavitation.

U.S. Pat. No. 6,533,462 provides a cage assembly for rolling element bearings having grooves to provide grease lubrication to the bearing. The grooves are internal and circumferential to the cage pocket and connected to a grease lubricant storing cavity. The cage assembly is designed for lubrication of slower speed ball bearings, and therefore uses lubricating grease rather than oil. The cage assembly, while providing sufficient lubrication to the cage pocket, does not prevent cavitation of lubricating oil.

As can be seen, there is a need for rolling element cage assembly that eliminates cavitation of lubricating oil. Methods for use of such a rolling element cage assembly in high-speed applications would also be desired. Elimination of the cavitation will increase the life of the rolling element cage by decreasing wear and subsequent fatigue failure of the cage.

SUMMARY OF THE INVENTION

In one aspect of the invention there is provided a bearing cage for a rolling element bearing, the bearing cage comprising a circular ring further comprising a plurality of cage pockets at predetermined intervals along a circumference of the circular ring; wherein at least one of the cage pockets has a first inner face at a leading edge and a second inner face at a trailing edge; and wherein at least one of the cage pockets has at least one first groove on the first inner face of the leading edge and at least one second groove on the second inner face of the trailing edge.

In another aspect of the invention there is provided a rolling element bearing cage comprising a circular ring further comprising a plurality of cage pockets at predetermined intervals along a circumference of the circular ring; wherein at least one of the cage pockets comprises a first inner face at a leading edge and a second inner face at a trailing edge; wherein at least one of the cage pockets comprises at least two first grooves on the first inner face of the leading edge and at least two second grooves on the second inner face of the trailing edge, the first grooves running the length of the first inner face and the second grooves running the length of the second inner face; and at least one rolling element wherein the rolling element is disposed in the cage pocket.

In a further aspect of the invention there is provided a rolling element bearing case assembly comprising an annular cage comprising a circular ring which comprises a plurality of cage pockets at predetermined intervals along a circumferential direction of the circular ring; wherein at least one of the cage pockets comprises a first inner face at a leading edge and a second inner face at a trailing edge; wherein at least one of the pockets comprises at least two first grooves on the first inner face of the leading edge and at least two second grooves on the second inner face of the trailing edge, the first grooves running the length of the first inner face and the second grooves running the length of the second inner face; at least one rolling element wherein at least one rolling element is disposed in the cage pocket; and concentric inner and outer races, wherein the annular cage is disposed concentrically between the inner and outer races.

In yet another aspect of the invention there is provided a high-speed turbine engine comprising a rolling element bearing assembly, the rolling element bearing assembly comprising: a cage comprising a circular ring further comprising a plurality of pockets at predetermined intervals along a circumference of the circular ring; wherein at least one of the cage pockets has a first inner face at a leading edge and a second inner face at a trailing edge; wherein at least one of the cage pockets has at least two first grooves on the first inner face of the leading edge and at least two second grooves on the second inner face of the trailing edge, the first grooves running the length of the first inner face and the second grooves running the length of the second inner face; at least one rolling element wherein the rolling element is disposed in the cage pocket; and concentric inner and outer races, wherein the cage is disposed concentrically between the inner and outer races.

In another aspect of the invention there is provided a method of preventing cavitation in an assembled rolling element bearing during operation comprising the steps of: rolling at least one rolling element at high speeds, wherein the rolling element is disposed in a bearing cage, the bearing cage comprising a circular ring further comprising an inner surface, an outer surface and a plurality of cage pockets at predetermined intervals along a circumference of the circular ring, wherein at least one of the cage pockets comprises a first inner face at a leading edge and a second inner face at a trailing edge and wherein at least one of the cage pockets comprises at least one first groove on the first inner face of the leading edge and at least one second groove on the second inner face of the trailing edge, the first groove running the length of the first inner face and the second groove running the length of the second inner face; lubricating the bearing cage pocket and the rolling element with a lubricant; pushing the lubricant from the bearing cage into the first groove as the rolling element approaches the first inner face of the bearing cage; allowing the lubricant to move from the first groove into the bearing cage as the rolling element moves away from the first face and replenishing the first groove with lubricant from the outer and inner surfaces of the bearing cage; pushing the lubricant from the bearing cage into the second groove the rolling element approaches the second inner face of the bearing cage; and allowing the lubricant to move from the second groove into the bearing cage as the rolling element moves away from the second face and replenishing the second groove with lubricant from the outer and inner surfaces of the bearing cage.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, a rolling element bearing anti-cavitation cage and a method of reducing cavitation using the cage are provided. The cage may be a circular ring with a plurality of cage pockets at predetermined intervals along a circumference of the circular ring. At least one pocket may be designed to hold a rolling element within the pocket. The pocket may have at least one groove on an inner face of a leading edge of the pocket and at least one groove on an inner face of a trailing edge of the pocket. The grooves may aid in preventing cavitation damage to the cage of the present invention. The cage of the present invention may also be concentrically disposed between an inner race and an outer race to produce a rolling element bearing for use in high-speed applications. Non-limiting examples of high-speed applications would be high-speed advanced turbine engines such as those used in aircraft and high speed turbo-pumps used in liquid fueled rocketry.

In the present invention, the grooves on the inner faces of the leading and trailing edges of the cage pocket may prevent cavitation by eliminating the low pressure region that exists in prior art designs when the rolling element moves away from the cage inner face. According to the present invention, when the rolling element approaches an inner face of the cage pocket, lubricant may be pushed into the grooves and out onto the outer and inner surfaces of the cage instead of away from the inner faces of the cage pocket. As the rolling element and cage subsequently move apart, the lubricant from the grooves may easily move into the gap created without causing cavitation. At the same time, the grooves may be replenished by lubricant from the outer and inner surfaces of the rolling element bearing anti-cavitation cage. Conventional rolling element bearing cages do not sufficiently address the problem of cavitation.

Figure 1:
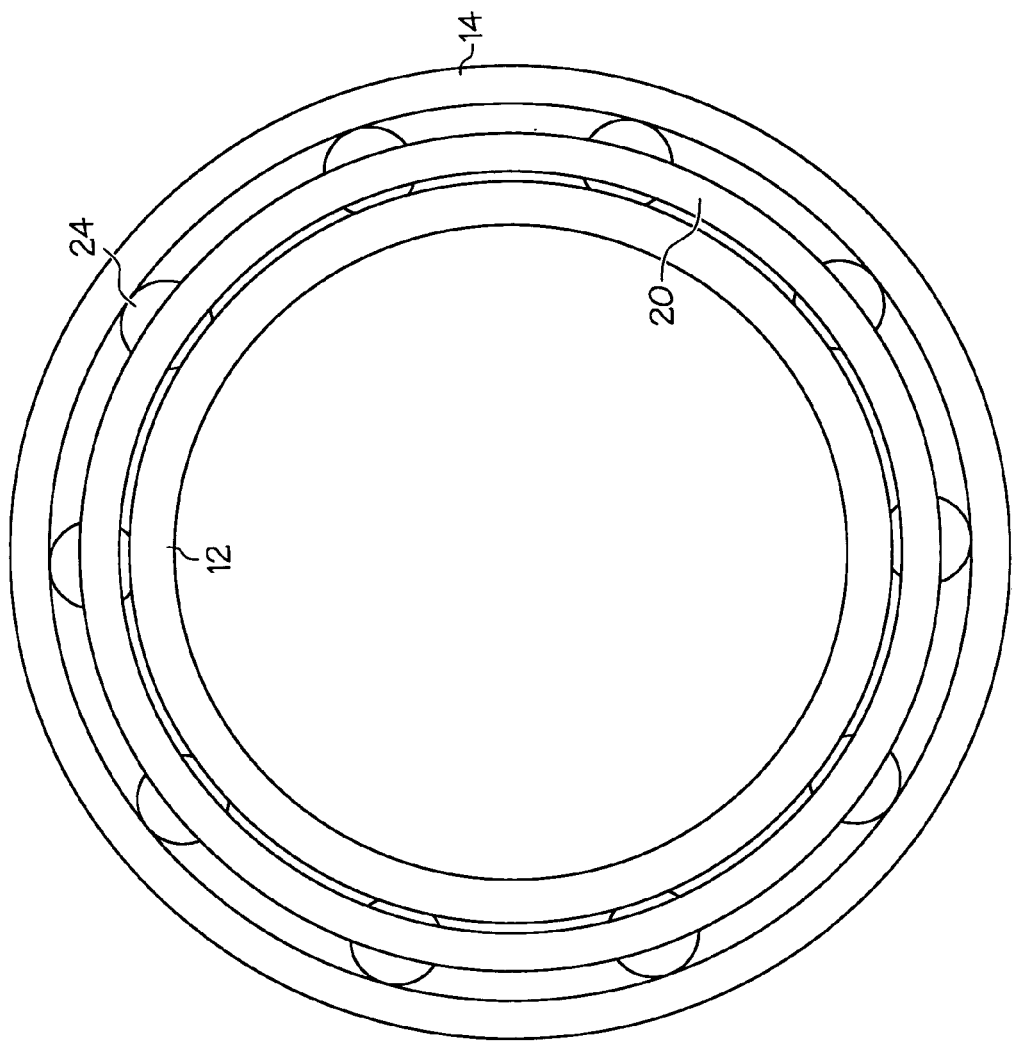
FIG. 1 is a plan view of an assembled rolling element bearing, according to the invention.

Illustrated in FIG. 1 is assembled rolling element bearing 10 which may include an inner race 12, an outer race 14, a rolling element bearing anti-cavitation cage 20, and a rolling element 24. Outer race 14 may be secured to a fixed structure such as, but not limited to, an engine casing (not shown) while inner race 12 may be integral with, or otherwise fixedly connected with, a shaft of a high-speed turbine engine (not shown).

Figure 2:
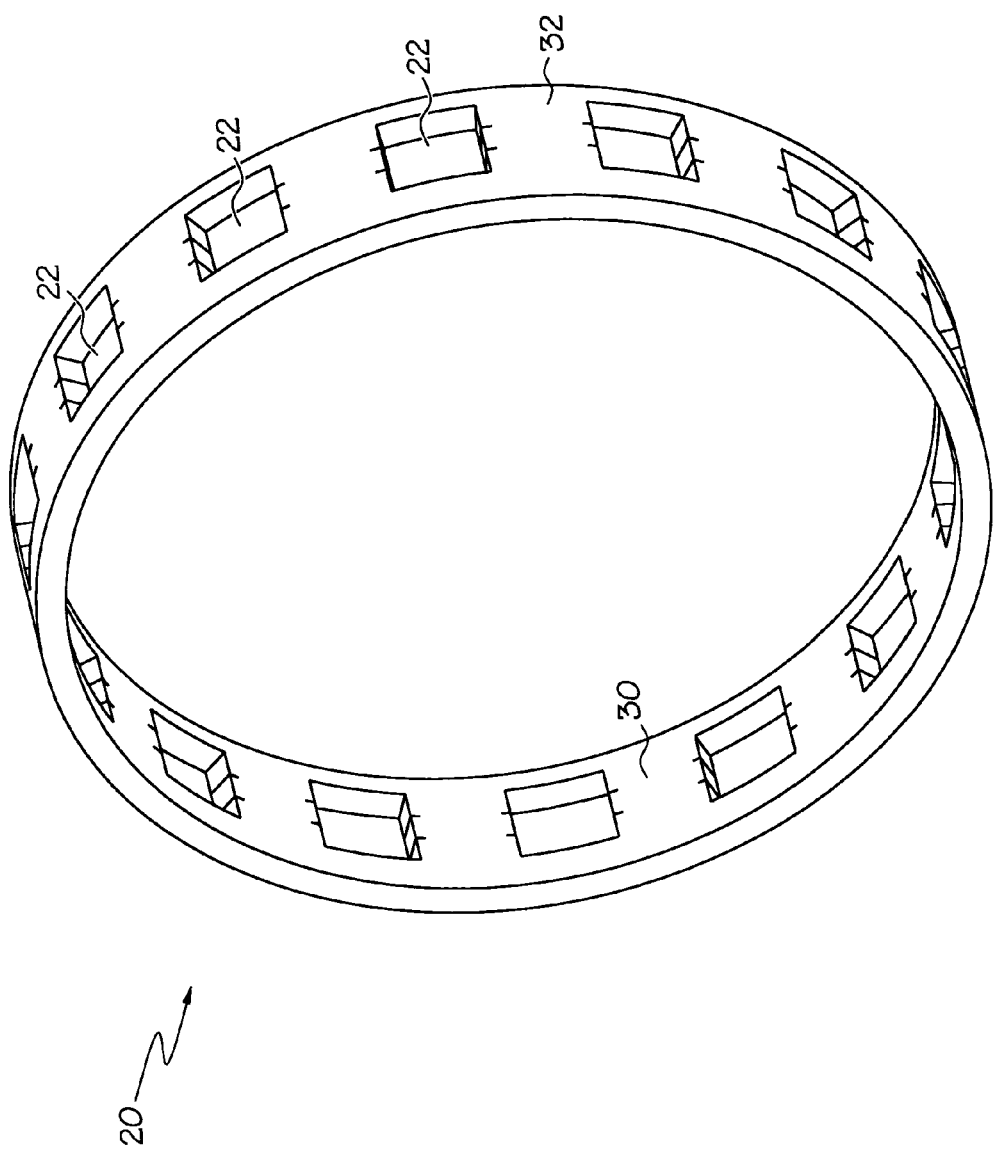
FIG. 2 is a plan view of a rolling element bearing anti-cavitation cage according to the invention.

Cage 20 is shown in FIG. 2 isolated from assembled rolling element bearing 10. Cage 20 may be a circular ring comprising a plurality of cage pockets 22 at predetermined intervals along a circumference of cage 20. Cage pockets 22 may hold rolling elements 24 (see FIG. 4) and therefore, may have dimensions sufficient to hold rolling elements 24 while allowing for free rotation of rolling element 24. The number and arrangement of cage pockets 22 around the circumference of cage 20 may depend on the size and/or the final use of assembled rolling element 10. Cage 20 may further be described as having an inner surface 30 and an outer surface 32.

Figure 3:
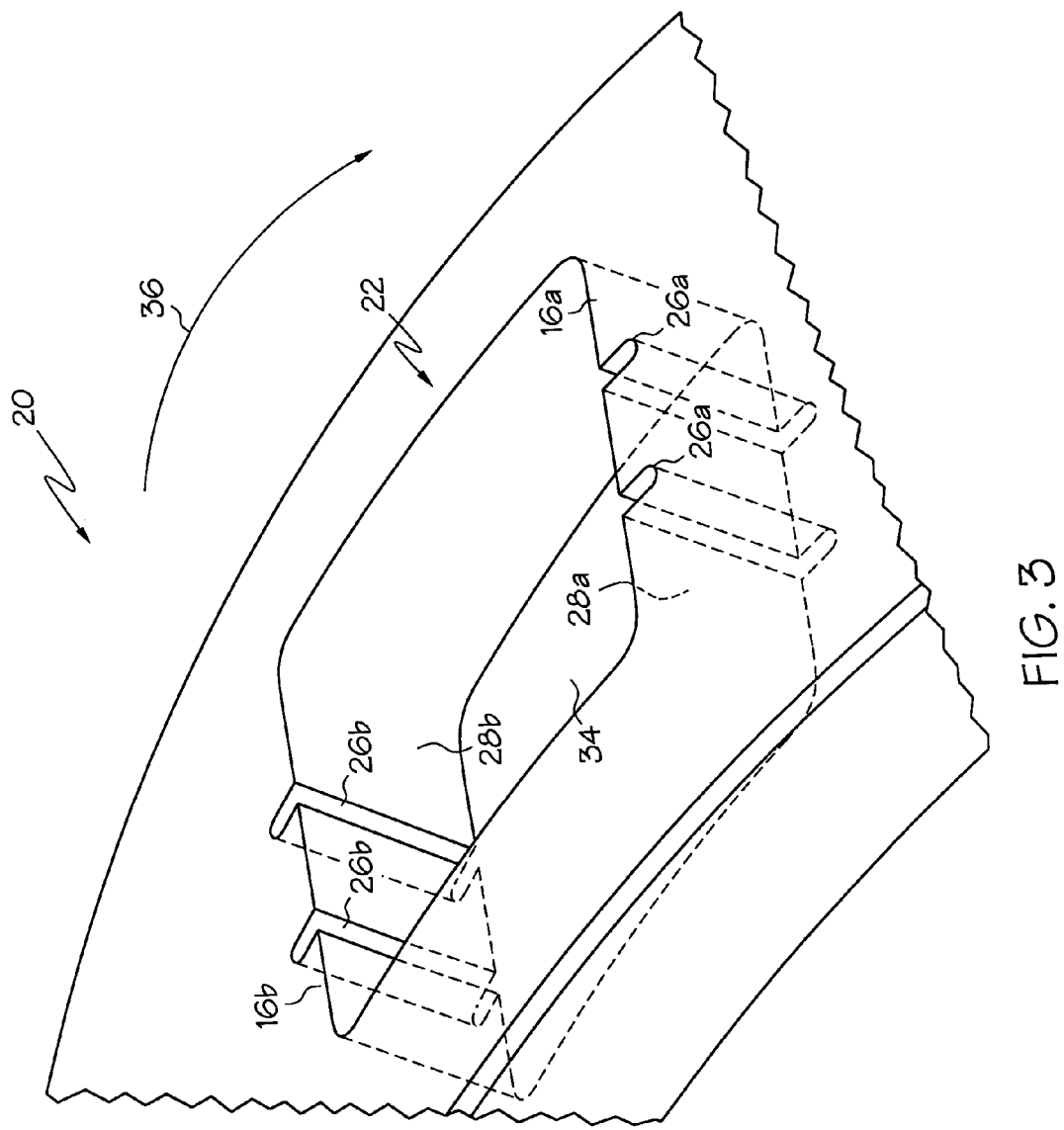
FIG. 3 is an expanded perspective view of the rolling element bearing anti-cavitation cage of FIG. 2 showing a cage pocket according to the present invention.
Figure 4:
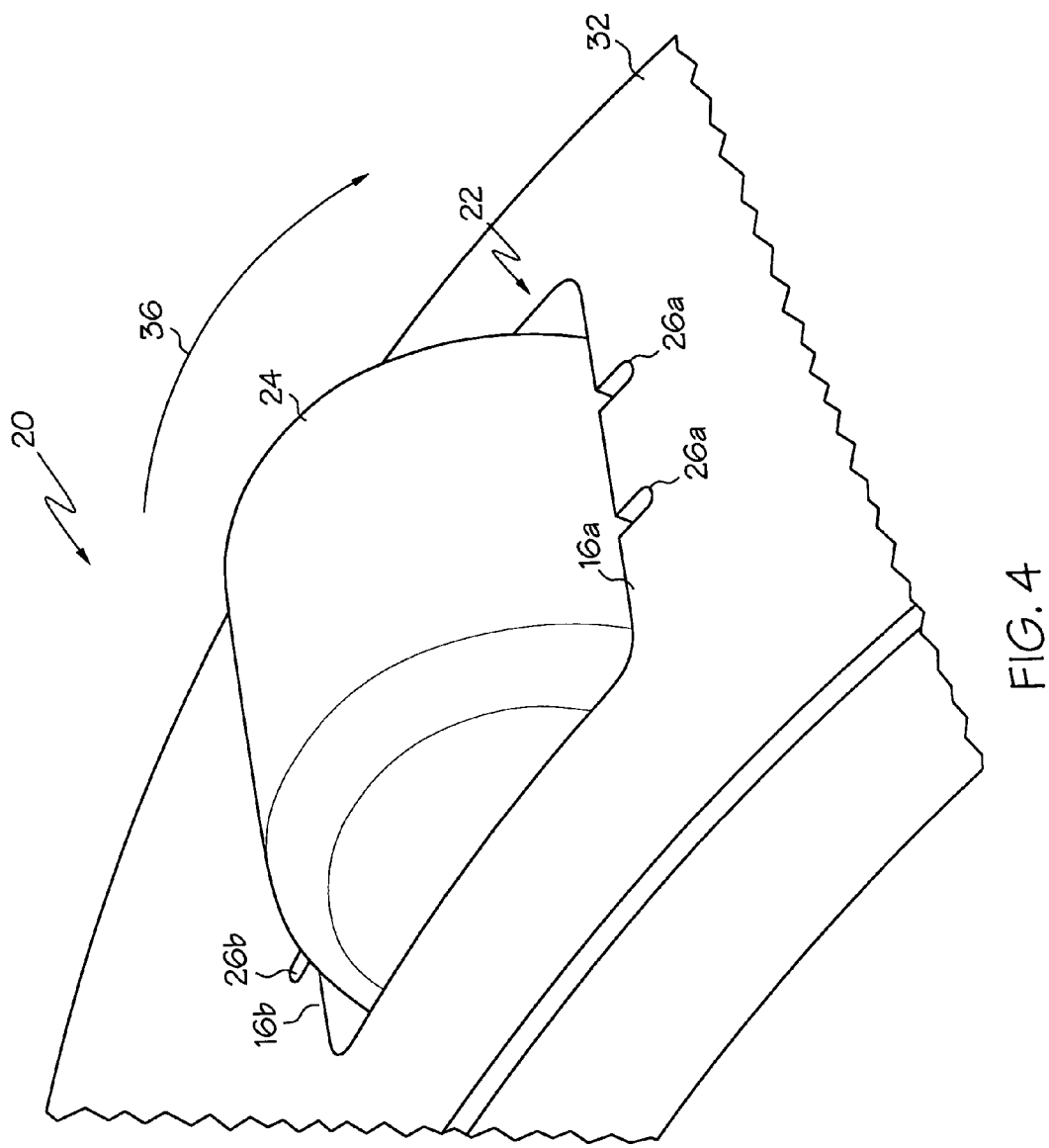
FIG. 4 is an expanded perspective view of the cage pocket of FIG. 3 with a rolling element in the pocket according to the invention.

Expanded views of cage pocket 22 with and without rolling element 24 are shown in FIGS. 3 and 4, respectively. Cage pocket 22 may comprise an opening 34 for holding rolling element 24. Cage pocket 22 may further comprise both a first inner face 28a and a second inner face 28b where first inner face 28a is along leading edge 16a of the cage pocket and a second inner face 28b is along the trailing edge 16b of the cage pocket. Leading edge 16a and trailing edge 16b are defined by the direction cage 20 is rotating when the assembled rolling element bearing is in use. For illustrative purposes, a direction of rotation has randomly been chosen and is noted by arrow 36. At least one first groove 26a may be disposed on first inner face 28a of leading edge 16a and at least one second groove 26b may be disposed on second inner face 28b of trailing edge 16b. First and second grooves 26a, 26b may be placed where cavitation damage is conventionally observed on first and second inner faces 28a, 28b in the desired cage 20. The placement of first and second grooves 26a, 26b may depend on the dimensions of the bearing cage and bearing. The skilled artisan may know where cavitation damage occurs in a specific cage design based upon, but not limited to, either observation of such damage or the relationship of the design of the desired cage to another cage where it is known where cavitation damage occurs. The number of first and second grooves 26a, 26b in cage pocket 22 may be dependent on the size of cage pocket 22 and/or rolling element 14 as well as the lubricant viscosity.

In one exemplary embodiment, as illustrated in FIG. 3, cage pocket 22 may have two first grooves 26a on first leading edge 16a and two second grooves 26b on trailing edge 16b of cage pocket 22. In an alternate exemplary embodiment, cage pocket 22 may have three first grooves 26a on leading edge 16a and two second grooves 26b on trailing edge 16b. Both first and second grooves 26a, 26b may run the entire length of first and second inner faces 28a, 28b from outer surface 30 to inner surface 32 of cage 20. First grooves 26a on leading edge 16a may be symmetrical with respect to second grooves 26b on trailing edge 16b.

The dimensions of first and second grooves 26a, 26b may be dependent on several factors, including, but not limited to, the speed of rolling element 24 and the viscosity of the lubricant. For high-speed applications the lubricant may be, but not limited to, an oil lubricant. Using these parameters, the dimensions of width and depth of first and second grooves 26a, 26b may be determined empirically using computational fluid dynamics (CFD) codes. CFD codes are well known in the art and can either be commercially obtained or written by the skilled artisan to use to determine the dimensions of first and second grooves 26a, 26b. Non-limiting examples of commercial CFD codes that may be used with the present invention are FLUENT™, FEMEHL, or STAR-CD. Using the CFD codes and the factors for rolling element bearing speed and lubricant velocity, the width and depth of first and second grooves 26a, 26b that give the thickest, highest minimum lubricant film as rolling element 24 is rolling may be determined. The dimensions of first and second grooves 26a, 26b may be such that a thin film of oil will always be present between rolling element 24 and first and second inner faces 28a, 28b of cage pocket 22.

For example, but not limited to, a roller bearing cage having a roller with dimensions of 7 mm diameter and 7 mm length, a cage speed of 27,000 rpm and rolling element spin speed of 274,000 rpm, and a lubricant with a viscosity of about 0.70 μReyn may have optimal first and second grooves 26a, 26b having a depth of from about 0.005 inches to about 0.030 inches and a width of from about 0.012 inches to about 0.035 inches. The grooves may be located from about 0.080 inches to about 0.100 inches from the pocket edges.

Figure 5:
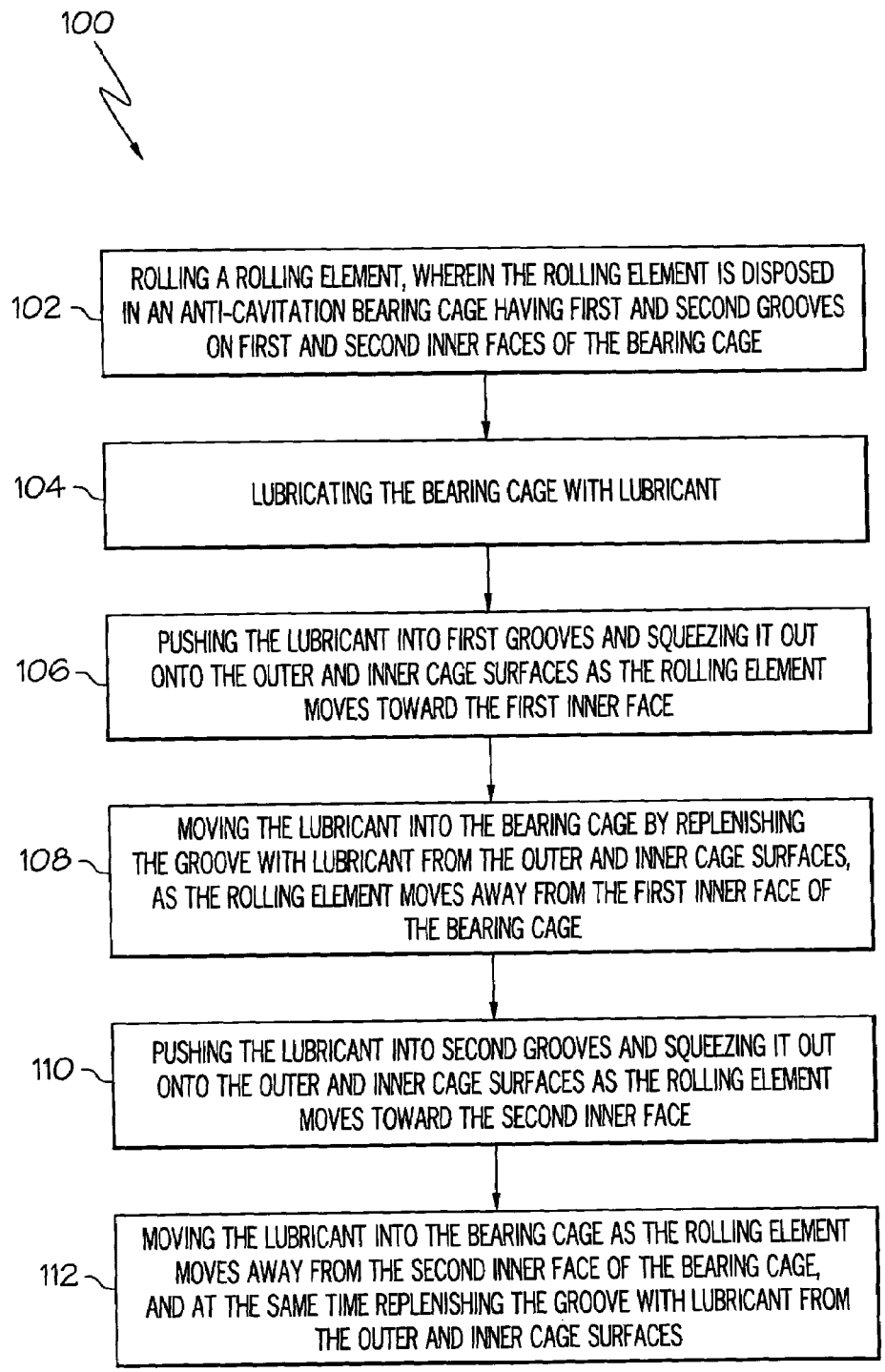
FIG. 5 is a flow chart showing a method of reducing cavitation using a rolling element bearing anti-cavitation cage according to the invention.

A method for preventing cavitation of the lubricant in a cage pocket during operation of an assembled rolling element bearing is provided by the present invention. As shown in FIG. 5, method 100 comprises the step 102 of rolling at least one rolling element, wherein the rolling element may be disposed in a bearing cage, the bearing cage comprising a circular ring further comprising a plurality of cage pockets at predetermined intervals along a circumferential direction of the circular ring is provided. At least one of the cage pockets may comprise a first inner face at a leading edge and a second inner face at a trailing edge and wherein at least one of the cage pockets may comprise at least one first groove on the first inner face of the leading edge and at least one second groove on the second inner face of the trailing edge, the first groove running the length of the first inner face and the second groove running the length of the second inner face. In step 104, the cage pocket may be lubricated during operation of the assembled rolling element bearing. The type of lubricant used may depend on the application. For example, if method 100 is used in a high-speed turbine engine, then the lubricant may be a liquid such as, but not limited to, mineral or synthetic oil. Alternatively, if method 100 is being used in a high-speed turbo-pump, the lubricant may be the working fluid of the turbo-pump such as, but not limited to, propellants, liquid hydrogen fuel or liquid oxygen fuel. In step 106, the lubricant may be pushed into the first groove and out onto the outer and inner surfaces of the cage as the rolling element approaches the first inner face of the cage pocket. In step 108, the lubricant may be moved back into the cage pocket as the rolling element moves away from the first inner face of the cage pocket. At the same time, the grooves may replenished by lubricant from the outer and inner surfaces of the cage. In step 110, the lubricant may be pushed into the second grooves and out onto the outer and inner surfaces of the cage as the rolling element approaches the second inner face of the cage pocket. Finally, in step 112, the lubricant may be moved back into the cage pocket as the rolling element moves away from the second inner face, and at the same time, the grooves may be replenished by lubricant from the outer and inner surfaces of the cage. Steps 106 and 108 as well as 110 and 112 may be repeated as necessary during the operation of a rolling element bearing assembly. Use of the rolling element anti-cavitation cage of the present invention eliminates cavitation during operation of the assembled bearing. The assembled rolling element bearing may be used in any high-speed application to eliminate cavitation including, but not limited to, high speed turbine engines or high-speed turbo-pumps.

It should be understood, of course, that the foregoing relates to exemplary embodiments of the invention and that modifications may be made without departing from the spirit and scope of the invention as set forth in the following claims.

We claim:

1. A rolling element bearing cage comprising:
   a circular ring having inner and outer surfaces comprising a plurality of cage pockets at predetermined intervals along a circumference of the circular ring;
   wherein at least one of the cage pockets has a first inner face at a leading edge and a second inner face at a trailing edge;
   wherein at least one of the cage pockets has at least two first grooves on the first inner face of the leading edge and at least two second grooves on the second inner face of the trailing edge, the first grooves running the length of the first inner face and the second grooves running the length of the second inner face, each groove having a length and a width, the length being greater than the width and extending from the inner surface of the circular ring to the outer surface of the circular ring; and
   at least one rolling element, wherein the rolling element is disposed in the cage pocket and the rolling element bearing cage is part of a high-speed turbine engine and a high-speed turbo-pump.

2. The rolling element bearing cage of claim 1 further comprising an annular inner race and an annular outer race, wherein the bearing cage is disposed concentrically between the inner and outer races.

3. The rolling element bearing cage of claim 1 wherein the first grooves are symmetrically arranged on the first inner face and the second grooves are symmetrically arranged on the second inner face.

4. The rolling element bearing cage of claim 1 wherein the circular ring has inner and outer surfaces and the first and second grooves extend from the inner surface of the circular ring to the outer surface of the circular ring.

5. A rolling element bearing assembly comprising:
   a cage comprising a circular ring further comprising a plurality of pockets at predetermined intervals along a circumference of the circular ring;
   wherein at least one of the cage pockets has a first inner face at a leading edge and a second inner face at a trailing edge thereof, the first and second inner faces each having a length and a width, the width of each face being greater than the length of each face;

wherein at least one of the cage pockets has at least three first grooves on the first inner face of the leading edge and at least three second grooves on the second inner face of the trailing edge, the first grooves running the length of the first inner face and the second grooves running the length of the second inner face, the grooves each having a length and a width, the length of each groove being greater than the width of each groove;

at least one rolling element wherein the rolling element is disposed in the cage pocket; and concentric inner and outer races, wherein the cage is disposed concentrically between the inner and outer races.

6. The rolling element bearing assembly of claim 5 wherein the first grooves are symmetrically arranged on the first inner face and the second grooves are symmetrically arranged on the second inner face.

7. The rolling element bearing assembly of claim 5 wherein the first and second grooves have a depth of from about 0.005 inches to about 0.030 inches and the width of the first and second grooves is from about 0.012 inches to about 0.035 inches.

8. The rolling element bearing assembly of claim 5 wherein the rolling element bearing assembly is part of a high-speed turbine engine and a high-speed turbo-pump.

9. The rolling element bearing assembly of claim 5 wherein the circular ring has inner and outer surfaces and the first and second grooves extend from the inner surface of the circular ring to the outer surface of the circular ring.

10. A method of preventing cavitation in an assembled rolling element bearing during operation comprising the steps of:

rolling at least one rolling element at high speeds, wherein the rolling element is disposed in a rolling element bearing cage, the bearing cage comprising a circular ring further comprising an inner surface, an outer surface, and a plurality of cage pockets at predetermined intervals along a circumference of the circular ring, wherein at least one of the cage pockets comprises a first inner face at a leading edge and a second inner face at a trailing edge and wherein at least one of the cage pockets comprises at least three first grooves on the first inner face of the leading edge and at least three second grooves on the second inner face of the trailing edge, the first grooves running the length of the first inner face and the second grooves running the length of the second inner face, each groove having a length and a width, the length being greater than the width and extending between the inner and outer surface of the circular ring;

lubricating the bearing cage pocket and the rolling element with a lubricant;

pushing the lubricant from the bearing cage into the first grooves as the rolling element approaches the first inner face of the bearing cage;

allowing the lubricant to move from the first grooves into the bearing cage as the rolling element moves away from the first face and replenishing the first grooves with lubricant from the outer and inner surfaces of the bearing cage;

pushing the lubricant from the bearing cage into the second grooves the rolling element approaches the second inner face of the bearing cage; and allowing the lubricant to move from the second grooves into the bearing cage as the rolling element moves away from the second face, and replenishing the second grooves with lubricant from the outer and inner surfaces of the bearing cage.

11. The method of claim 10 wherein the lubricant is a liquid.

12. The method of claim 10 wherein the method is used in a high-speed engine.

13. The method of claim 12 wherein the lubricant is an oil.

14. The method of claim 13 wherein the oil is either a mineral oil or a synthetic oil.

15. The method of claim 10 wherein the width of each face is greater than the length of each face.

16. The method of claim 15 wherein the lubricant is a working fluid of the turbo-pump.

17. A rolling element bearing assembly comprising:

a cage comprising a circular ring further comprising a plurality of pockets at predetermined intervals along a circumference of the circular ring;

wherein at least one of the cage pockets has a first inner face at a leading edge and a second inner face at a trailing edge thereof, the first and second inner faces each having a length and a width, the width of each face being greater than the length of each face;

wherein at least one of the cage pockets has at least two first grooves on the first inner face of the leading edge and at least two second grooves on the second inner face of the trailing edge, the first grooves running the length of the first inner face and the second grooves running the length of the second inner face, the grooves each having a length and a width, the length of each groove being greater than the width of each groove and wherein the first and second grooves have a depth of from about 0.005 inches to about 0.030 inches and the width of the first and second grooves is from about 0.012 inches to about 0.035 inches;

at least one rolling element wherein the rolling element is disposed in the cage pocket; and concentric inner and outer races, wherein the cage is disposed concentrically between the inner and outer races.

* * * * *